US009733556B2

(12) United States Patent
Egawa

(10) Patent No.: US 9,733,556 B2
(45) Date of Patent: Aug. 15, 2017

(54) WAVELENGTH CONVERSION DEVICE, ILLUMINATION DEVICE, AND PROJECTOR

(71) Applicant: SEIKO EPSON CORPORATION, Tokyo (JP)

(72) Inventor: Akira Egawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/196,954

(22) Filed: Jun. 29, 2016

(65) Prior Publication Data

US 2017/0010523 A1    Jan. 12, 2017

(30) Foreign Application Priority Data

Jul. 10, 2015 (JP) ................. 2015-138885

(51) Int. Cl.
*G03B 21/20* (2006.01)
*H04N 9/31* (2006.01)
*G02B 7/00* (2006.01)
*G03B 21/16* (2006.01)
*G02B 26/00* (2006.01)

(52) U.S. Cl.
CPC ............ *G03B 21/16* (2013.01); *G02B 7/008* (2013.01); *G02B 26/008* (2013.01); *G03B 21/204* (2013.01); *H04N 9/3144* (2013.01); *H04N 9/3158* (2013.01); *H04N 9/3161* (2013.01)

(58) Field of Classification Search
CPC ...... G03B 21/16; G03B 21/204; G02B 7/008; G02B 26/008; H04N 9/3144; H04N 9/3158; H04N 9/3161
See application file for complete search history.

(56) References Cited

U.S. PATENT DOCUMENTS

| 7,234,820 B2 * | 6/2007 | Harbers ............. G02B 27/0983 348/E9.027 |
| 2003/0179579 A1 * | 9/2003 | Hsu ........................ G03B 21/16 362/294 |
| 2012/0106126 A1 * | 5/2012 | Nojima ................ G02B 26/008 362/84 |
| 2015/0042963 A1 | 2/2015 | Nishimori et al. | |

FOREIGN PATENT DOCUMENTS

| JP | 2011-075898 A | 4/2011 |
| JP | 2012-181431 A | 9/2012 |
| JP | 2014-092599 A | 5/2014 |
| JP | 2015-036708 A | 2/2015 |

* cited by examiner

*Primary Examiner* — Michael Teitelbaum
(74) *Attorney, Agent, or Firm* — Oliff PLC

(57) ABSTRACT

A wavelength conversion device includes a wavelength conversion element, and a cooling device adapted to cool the wavelength conversion element. The cooling device has a first blower device, and the wavelength conversion element is disposed on an intake side of the first blower device.

15 Claims, 8 Drawing Sheets

WAVELENGTH CONVERSION DEVICE, ILLUMINATION DEVICE, AND PROJECTOR

BACKGROUND

1. Technical Field

The present invention relates to a wavelength conversion device, an illumination device, and a projector.

2. Related Art

In the past, there has been known a projector, which modulates light emitted from a light source device to thereby form an image corresponding to image information, and projects the image on a projection target surface such as a screen in an enlarged manner. As such a projector, there has been known a projector provided with a wavelength conversion device, which is excited by excitation light entering the wavelength conversion device to emit fluorescence (see, e.g., JP-A-2011-75898).

The projector described in JP-A-2011-75898 is provided with a light source unit, a display element, a projection optical system, and a cooling fan. The light source unit has alight source device for emitting blue light, alight source device for emitting the excitation light, and a fluorescence emitting device. The fluorescence emitting device is provided with a phosphor wheel, which is excited by the excitation light entering the phosphor wheel to emit the fluorescence, and a wheel motor for rotating the phosphor wheel.

In such a projector, the cooling fan directly blows the outside air against the phosphor wheel and the wheel motor as cooling air to cool the phosphor wheel and the wheel motor.

Incidentally, in the case in which the cooling gas blows against the fluorescence emitting device as in the projector described in JP-A-2011-75898, the cooling efficiency in the place, which the cooling gas blows against, is high, but the cooling efficiency in the place, which the cooling gas does not blow against, is low. Therefore, in the projector described in JP-A-2011-75898, there arises a problem that the fluorescence emitting device (the wavelength conversion element) cannot efficiently be cooled.

SUMMARY

An advantage of some aspects of the invention is to provide a wavelength conversion device improved in cooling efficiency. Another advantage of some aspects of the invention is to provide an illumination device equipped with the wavelength conversion device described above. Still another advantage of some aspects of the invention is to provide a projector equipped with the illumination device described above.

A wavelength conversion device according to a first aspect of the invention includes a wavelength conversion element, and a cooling device adapted to cool the wavelength conversion element, the cooling device has a first blower device, and the wavelength conversion element is disposed on an intake side of the first blower device.

According to the first aspect, since the wavelength conversion element is disposed on the intake side of the first blower device, the cooling gas is sucked by the first blower device to thereby supply the wavelength conversion element with the cooling gas. Thus, the wavelength conversion element is cooled. Further, since the cooling gas having been used for cooling the wavelength conversion element and thus heated is sucked by the first blower device, even in a configuration in which the wavelength conversion element rotates, there is reduced the chance that the cooling gas is spooled up again by the wavelength conversion element to be retained. Therefore, the cooling efficiency of the wavelength conversion element can be improved.

In the first aspect, it is preferable that the wavelength conversion element is disposed in a negative-pressure region caused by driving the first blower device.

According to this configuration, since the wavelength conversion element is disposed in the negative-pressure region described above, the gas, that is, the cooling gas having been used for cooling the wavelength conversion element, located in the periphery of the wavelength conversion element is apt to be sucked by the first blower device. Therefore, the cooling efficiency of the wavelength conversion element can be improved.

In the first aspect, it is preferable that the cooling device further includes a second blower device adapted to feed a cooling gas to the wavelength conversion element, and a first duct in which the wavelength conversion element, the first blower device, and the second blower device are disposed, and a flow path resistance between an intake surface of the first blower device and the wavelength conversion element is smaller than a flow path resistance between an exhaust surface of the second blower device and the wavelength conversion element.

According to this configuration, since the cooling gas is supplied by the second blower device to the wavelength conversion element, the cooling efficiency of the wavelength conversion element can be enhanced. Further, the flow path resistance between the intake surface of the first blower device and the wavelength conversion element is smaller than the flow path resistance between the exhaust surface of the second blower device and the wavelength conversion element. According to this configuration, in the flow of the air in the periphery of the wavelength conversion element, sucking of the cooling gas by the first blower device is dominant over feeding of the cooling gas by the second blower device. Therefore, the cooling gas having been supplied by the second blower device to the wavelength conversion element is more efficiently sucked by the first blower device. Therefore, the cooling efficiency of the wavelength conversion element can further be improved.

In the first aspect, it is preferable that the cooling device further includes a housing adapted to house the wavelength conversion element and the first blower device, and having a circulation flow path through which a cooling gas having been discharged by the first blower device is supplied to the wavelength conversion element, and a flow path resistance between an intake surface of the first blower device and the wavelength conversion element is smaller than a flow path resistance between an exhaust surface of the first blower device and the wavelength conversion element.

According to this configuration, since the flow path resistance between the intake surface of the first blower device and the wavelength element is smaller than the flow path resistance between the exhaust surface of the first blower device and the wavelength conversion element, sucking on the intake surface side of the first blower device is dominant over feeding on the exhaust surface side of the first blower device. Thus, since the cooling gas in the periphery of the wavelength conversion element can efficiently be sucked, the cooling efficiency of the wavelength conversion element can be enhanced.

In the first aspect, it is preferable that the wavelength conversion element and the first blower device are roughly encapsulated by the housing.

According to this configuration, since the wavelength conversion element and the first blower device are roughly encapsulated by the housing, the gas in the outside of the housing can be inhibited from flowing into the housing. Therefore, the dust can be inhibited from flowing into the housing, and by extension, the dust can further be inhibited from adhering to the wavelength conversion element.

In the first aspect, it is preferable that the wavelength conversion element includes a substrate rotatable around a rotational axis, and a phosphor layer disposed on the substrate.

According to this configuration, there is no chance that a specific place of the wavelength conversion element is continuously irradiated with the excitation light. Further, due to the rotation of the rotary wheel, the wavelength conversion element becomes easy to be cooled. Therefore, the temperature of the wavelength conversion element is hard to rise.

In the first aspect, it is preferable that the first blower device is located in a direction perpendicular to the rotational axis viewed from the substrate.

According to this configuration, compared to the case in which the first blower device is disposed in a direction along the rotational axis described above, the cooling gas in the periphery of the substrate can more efficiently be sucked. Further, compared to the case of disposing the first blower device in the direction along the rotational axis described above, selectability of the layout position of the first blower device can be enhanced. Therefore, the wavelength conversion device can be miniaturized.

In the first aspect, it is preferable that the cooling device further includes a second duct disposed in a flow path between the wavelength conversion element and the first blower device, and the second duct has a suction part extending in a direction crossing the rotational axis.

According to this configuration, since the suction part of the second duct extends in the direction crossing the rotational axis of the wavelength conversion element, the cooling gas, which has been used for cooling the wavelength conversion element, and thus heated, can efficiently be sucked from the suction part using the first blower device. Therefore, the cooling efficiency of the wavelength conversion element can further be improved.

An illumination device according to a second aspect of the invention includes any one of the wavelength conversion devices described above, and a light emitting element adapted to emit excitation light entering the wavelength conversion element.

According to the second aspect, substantially the same advantages as those of the wavelength conversion device according to the first aspect can be exerted. Further, since the wavelength conversion element, which rises in temperature due to the light emitted from the light emitting element described above, can efficiently be cooled, the cooling efficiency of the illumination device can be enhanced, and in addition, the stable illumination light can be emitted from the illumination device.

A projector according to a third aspect of the invention includes the illumination device described above, a light modulation device adapted to modulate light emitted from the illumination device in accordance with an image signal, a projection optical device adapted to project the light modulated by the light modulation device, and an exterior housing adapted to house the illumination device, the light modulation device, and the projection optical device.

According to the third aspect, substantially the same advantages as those of the wavelength conversion device according to the first aspect and the illumination device according to the second aspect can be exerted. Further, since the stable illumination light is supplied from the illumination device equipped with the wavelength conversion device described above, a clearer image can be projected.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will hereinafter be described with reference to the accompanying drawings.

Schematic Configuration of Projector

Figure 1:
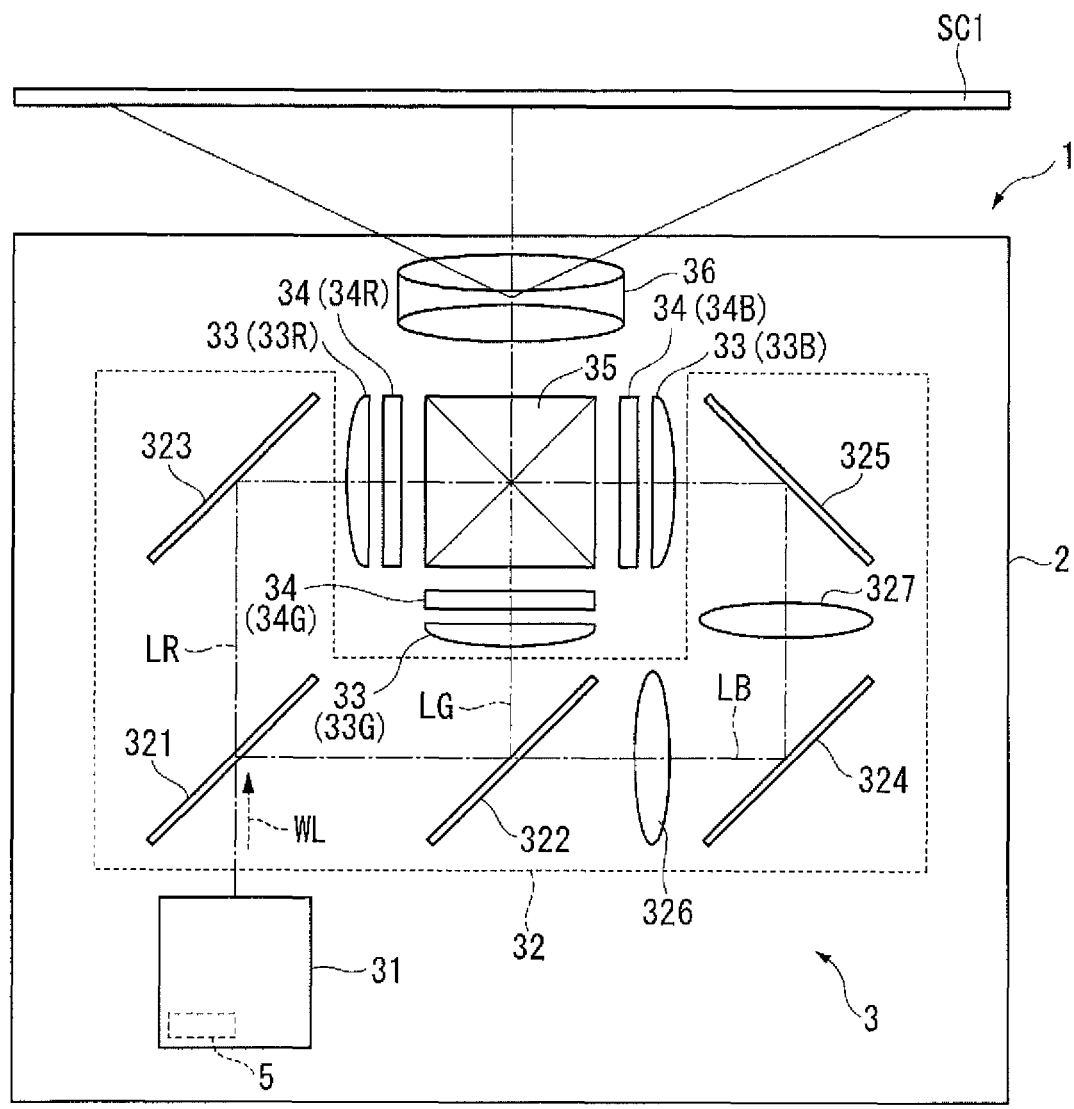
FIG. 1 is a schematic diagram showing a general configuration of a projector according to a first embodiment of the invention.

FIG. 1 is a schematic diagram showing a configuration of a projector 1 according to the present embodiment.

The projector 1 is a display device, which modulates a light beam emitted from a light source disposed inside to form an image corresponding to image information, and then projects the image on a projection target surface such as a screen SC1 in an enlarged manner.

As shown in FIG. 1, in addition to an exterior housing 2 and an optical unit 3 housed in the exterior housing 2, the projector 1 is provided with a control device for controlling the projector 1, a cooling device for cooling a cooling object, and a power supply device for supplying electrical power to electronic components constituting the projector 1 although not shown in the drawings.

Configuration of Optical Unit

The optical unit 3 is provided with an illumination device 31, a color separation device 32, collimating lenses 33, light modulation devices 34, a color combining device 35, and a projection optical device 36.

The illumination device 31 emits illumination light WL. It should be noted that the configuration of the illumination device 31 will be described later.

The color separation device 32 separates the illumination light WL input from the illumination device 31 into three colored light beams of red (R), green (G), and blue (B). The color separation device 32 is provided with dichroic mirrors 321, 322, total reflection mirrors 323, 324, and 325, and relay lenses 326, 327.

The dichroic mirror 321 separates the illumination light WL from the illumination device 31 into red light LR and other colored light (green light LG and blue light LB). The dichroic mirror 321 transmits the red light LR, while reflecting the other colored light (the green light LG and the blue light LB). The dichroic mirror 322 separates the other colored light into the green light LG and the blue light LB. The dichroic mirror 322 reflects the green light LG, while transmitting the blue light LB.

The total reflection mirror 323 is disposed in the light path of the red light LR, and reflects the red light LR, which has been transmitted through the dichroic mirror 321, toward the light modulation device 34 (34R). On the other hand, the total reflection mirrors 324, 325 are disposed in the light path of the blue light LB, and guide the blue light LB, which has been transmitted through the dichroic mirror 322, to the light modulation device 34 (34B). Further, the green light LG is reflected by the dichroic mirror 322 toward the light modulation device 34 (34G).

The relay lenses 326, 327 are disposed on the downstream side of the dichroic mirror 322 of the light path of the blue light LB. These relay lenses 326, 327 have a function of compensating a light loss of the blue light LB due to the fact that the light path length of the blue light LB becomes longer than the light path length of the red light LR or the green light LG.

The collimating lenses 33 each collimate the light entering the light modulation device 34. It should be noted that the collimating lenses for the colored light of red, green, and blue are denoted by 33R, 33G, and 33B, respectively. Further, the light modulation devices for the colored light of red, green, and blue are denoted by 34R, 34G, and 34B, respectively.

The light modulation devices 34 (34R, 34G, and 34B) modulate the colored light LR, LG, and LB of red, green, and blue input thereto to form colored images corresponding to the image information, respectively. These light modulation devices 34 are each formed of a liquid crystal panel for modulating the incident light. It should be noted that although not shown in the drawings, on the incident side and the exit side of each of the light modulation devices 34R, 34G, and 34B, there are disposed polarization plates, respectively.

To the color combining device 35, the image light from each of the light modulation devices 34R, 34G, and 34B is input. The color combining device 35 combines the image light beams corresponding to the respective colored light LR, LG, and LB with each other, and emits the image light beam thus combined toward the projection optical device 36. In the present embodiment, the color combining device 35 is formed of a cross dichroic prism.

The projection optical device 36 projects the image light combined by the color combining device 35 on the projection target surface such as the screen SC1. Due to such a configuration, an enlarged image is projected on the screen SC1.

Configuration of Illumination Device

Figure 2:
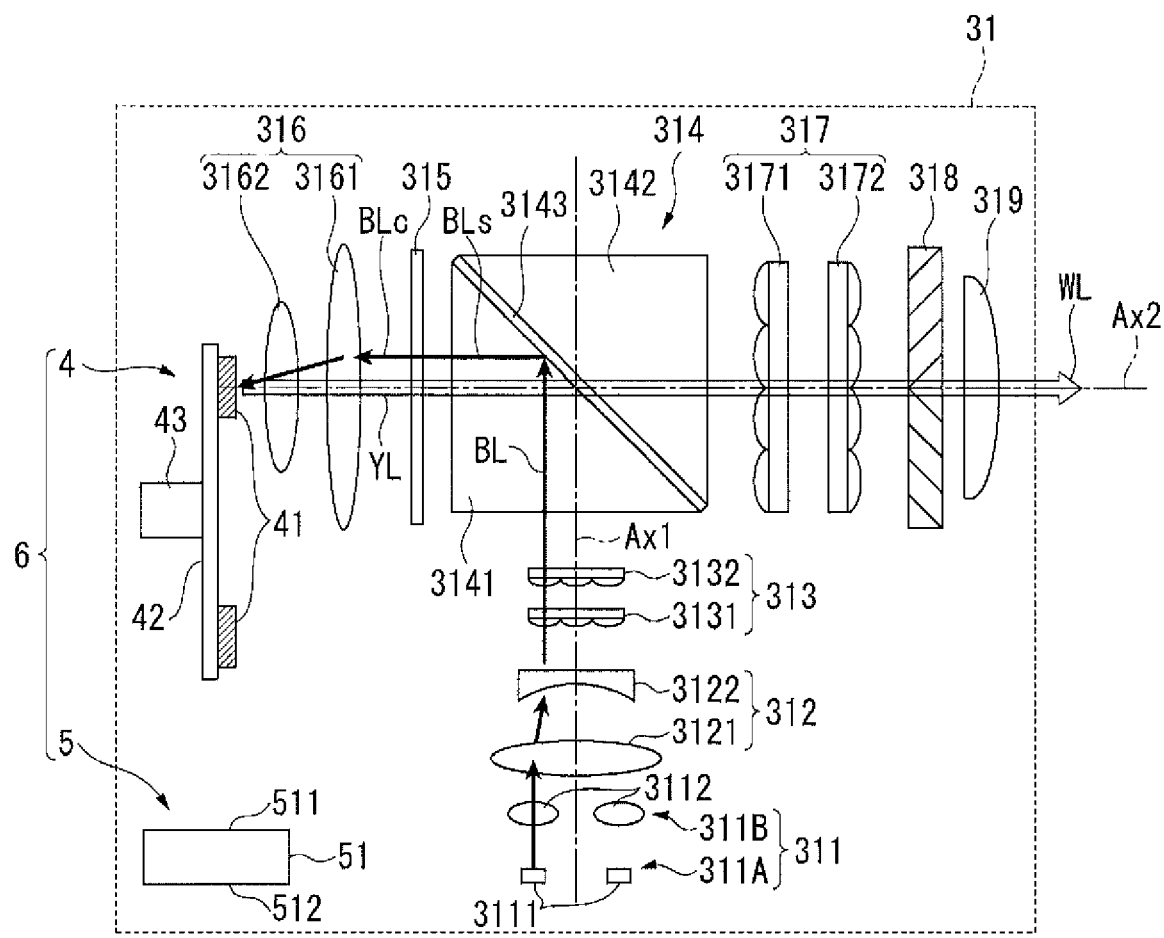
FIG. 2 is a schematic diagram showing a general configuration of an illumination device of the projector according to the first embodiment.

FIG. 2 is a schematic diagram showing a configuration of the illumination device 31 in the projector 1 according to the present embodiment.

The illumination device 31 emits an illumination light WL toward the color separation device 32 as described above. As shown in FIG. 2, the illumination device 31 is provided with a light source device 311, an afocal optical system 312, a homogenizer optical system 313, a polarization separation device 314, a wave plate 315, a pickup optical system 316, an integrator optical system 317, a polarization conversion element 318, an overlapping lens 319, a wavelength conversion element 4, and a cooling device 5. Further, the light source device 311 is provided with an array light source 311A and a collimator optical system 311B.

The array light source 311A of the light source device 311 corresponds to the light emitting element according to the invention, and is formed of a plurality of semiconductor lasers 3111. Specifically, the array light source 311A is formed by arranging the plurality of semiconductor lasers 3111 in an array in a plane perpendicular to an illumination light axis Ax1 of a light beam emitted from the array light source 311A. It should be noted that although described later in detail, denoting the illumination light axis of the light beam reflected by the wavelength conversion element 4 by Ax2, the illumination light axis Ax1 and the illumination light axis Ax2 exist in the same plane, and are perpendicular to each other. On the illumination light axis Ax1, the array light source 311A, the collimator optical system 311B, the afocal optical system 312, the homogenizer optical system 313, and the polarization separation device 314 are arranged in this order.

In contrast, on the illumination light axis Ax2, the wavelength conversion element 4 provided with a wavelength conversion layer 41, a pickup optical system 316, a wave plate 315, a polarization separation device 314, an integrator optical system 317, a polarization conversion element 318, and an overlapping lens 319 are arranged in this order.

The semiconductor lasers 3111 constituting the array light source 311A each emit the excitation light (the blue light BL) having a peak wavelength in the wavelength region of, for example, 440 through 480 nm. Further, the blue light BL emitted from each of the semiconductor lasers 3111 is coherent linearly-polarized light, and is emitted toward the polarization separation device 314 in parallel to the illumination light axis Ax1.

Further, the array light source 311A makes the polarization direction of the blue light BL emitted by each of the respective semiconductor lasers 3111 coincide with the polarization direction of the polarization component (S-polarization component) to be reflected by a polarization separation layer 3143 of the polarization separation device 314. Then, the blue light BL having been emitted from the array light source 311A enters the collimator optical system 311B.

The collimator optical system 311B is for converting the blue light BL having been emitted from the array light source 311A into parallel light. The collimator optical system 311B is provided with, for example, a plurality of collimator lenses 3112 arranged in an array corresponding respectively to the semiconductor lasers 3111. The blue light BL, which has been converted into the parallel light by passing through the collimator optical system 311B, enters the afocal optical system 312.

The afocal optical system 312 adjusts the beam diameter of the blue light BL having entered the afocal optical system 312 from the collimator optical system 311B. The afocal optical system 312 is provided with a lens 3121 and a lens 3122. The blue light BL, which has been adjusted in size by passing through the afocal optical system 312, enters the homogenizer optical system 313.

The homogenizer optical system 313 homogenizes the illuminance distribution by the blue light BL in the illumination target area in cooperation with the pickup optical system 316 described later. The homogenizer optical system 313 is provided with a pair of multi-lens arrays 3131, 3132. The blue light BL having been emitted from the homogenizer optical system 313 enters the polarization separation device 314.

The polarization separation device 314 is a so-called prism-type polarization beam splitter (PBS), and transmits the P-polarized light and reflects the S-polarized light. The polarization separation device 314 is provided with prisms 3141, 3142, and the polarization separation layer 3143. These prisms 3141, 3142 are each formed to have a roughly triangular prism shape, and each have a tilted surface having angles of 45° with the illumination light axis Ax1 and the illumination light axis Ax2.

The polarization separation layer 3143 is disposed on the tilted surface, and has a polarization separation function of separating the blue light BL in a first wavelength band having entered the polarization separation layer 3143 into the S-polarization component and the P-polarization. component. The polarization separation layer 3143 reflects the S-polarization component of the blue light BL and transmits the P-polarization component of the blue light BL. Further, the polarization separation layer 3143 has a color separation function of transmitting light in a second wavelength band (the green light LG and the red light LR) different from the first wavelength band (the wavelength band of the blue light BL) irrespective of the polarization state thereof. It should be noted that the polarization separation device 314 is not limited to the prism-type device, but a plate-type polarization separation device can also be used.

Then, the blue light BL having entered the polarization separation layer 3143 coincides in polarization direction with the S-polarization component, and is therefore reflected as the S-polarized excitation light BLs toward the wavelength conversion element 4.

The wave plate 315 is a quarter wave plate disposed in the light path between the polarization separation layer 3143 and the wavelength conversion layer 41. The excitation light BLS as the S-polarized light entering the wave plate 315 is converted into excitation light BLc as the circularly polarized light, and then enters the pickup optical system 316.

The pickup optical system 316 converges the excitation light BLc toward the wavelength conversion layer 41. The pickup optical system 316 is provided with a lens 3161 and a lens 3162. Specifically, the pickup optical system 316 converges the plurality of light beams (the excitation light BLc) having entered the pickup optical system 316 toward the wavelength conversion layer 41, and at the same time overlaps the light beams with each other on the wavelength conversion layer 41.

The wavelength conversion element 4 is provided with the wavelength conversion layer 41. The wavelength conversion layer 41 corresponds to a phosphor layer according to the invention, and emits the red light and the green light toward the side from which the blue light (the excitation light BLc) enters.

The excitation light BLc from the pickup optical system 316 enters the wavelength conversion layer 41. The wavelength conversion layer 41 converts a part of the excitation light BLc into fluorescence YL including the red light and the green light. The fluorescence YL has a peak wavelength in the wavelength region of 500 through 700 nm. The fluorescence YL having been emitted from the wavelength conversion layer 41 is transmitted through the pickup optical system 316, the wave plate 315, and the polarization separation device 314.

Further, another part of the excitation light BLc is emitted from the wavelength conversion layer 41, then transmitted through the pickup optical system 316, and then enters the wave plate 315. Another part of the excitation light BLc is converted by the wave plate 315 into the P-polarized blue light, and then further transmitted through the polarization separation device 314.

In such a manner as described above, the illumination light WL having a white color is generated. The illumination light WL is emitted from the polarization separation device 314, and enters the integrator optical system 317.

As described above, the light emitted from the array light source 311A is supplied to the wavelength conversion layer 41 via the optical system described above.

The integrator optical system 317 homogenizes the illuminance distribution in the illumination target area in cooperation with the overlapping lens 319 described later. The integrator optical system 317 is provided with a pair of lens arrays 3171, 3172. The pair of lens arrays 3171, 3172 are each formed of a component having a plurality of lenses arranged in an array. The illumination light WL having been emitted from the integrator optical system 317 enters the polarization conversion element 318.

The polarization conversion element 318 is formed of a polarization separation film and a wave plate, and converts the illumination light WL into linearly polarized light. The illumination light WL having been emitted from the polarization conversion element 318 enters the overlapping lens 319.

The overlapping lens 319 overlaps the illumination light WL in the illumination target area to thereby homogenize the illumination distribution of the illumination target area.

Configuration of Wavelength Conversion Device

As shown in FIG. 2, the wavelength conversion device 6 is formed of the wavelength conversion element 4 and the cooling device 5 disposed in the exterior housing 2. As described above, the wavelength conversion device 6 has a function of converting the wavelength of the light having entered the wavelength conversion element 4. The wavelength conversion element 4 and the cooling device 5 constituting the wavelength conversion device 6 will hereinafter be described in detail.

Configuration of Phosphor Member

Figure 3:
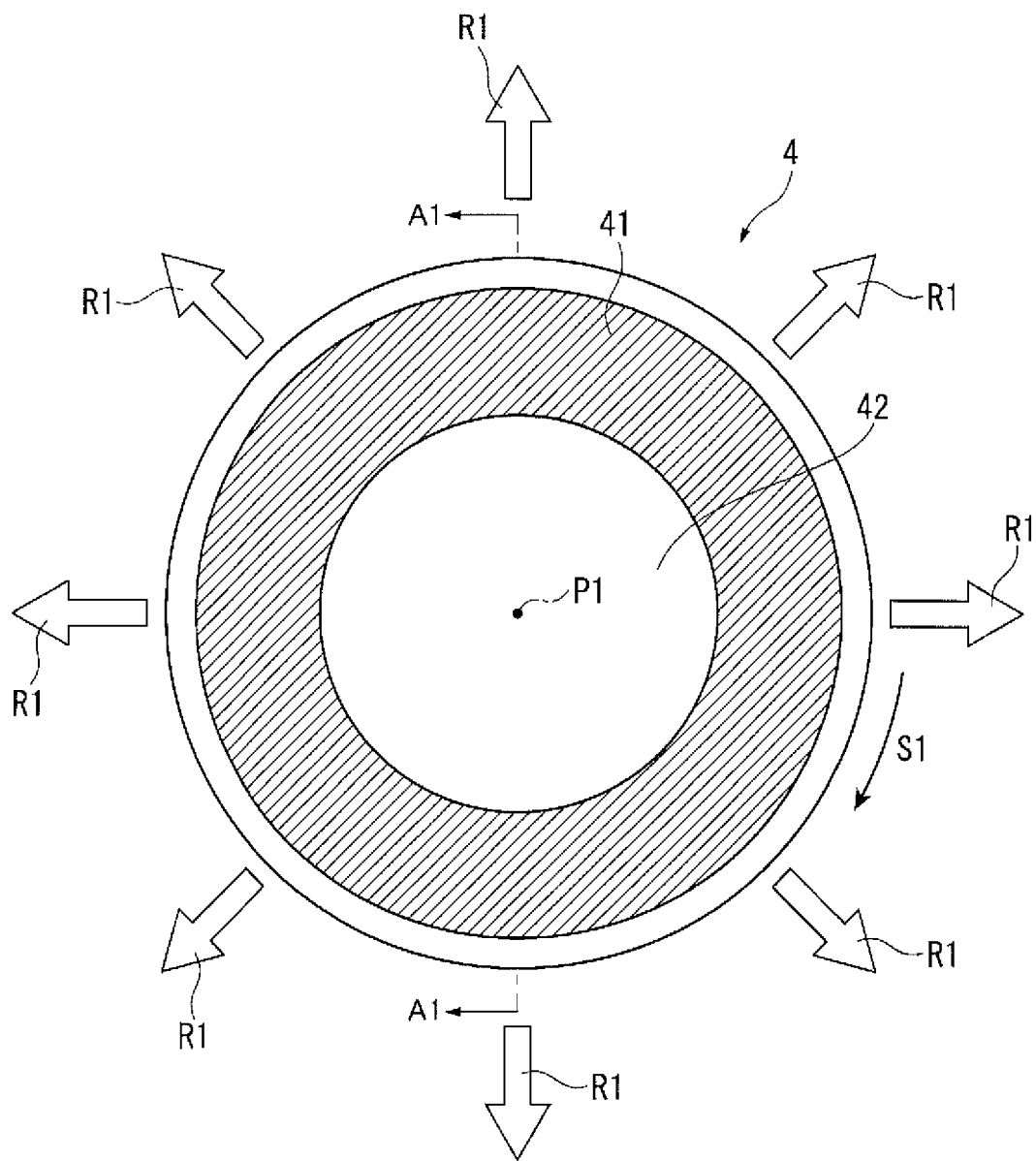
FIG. 3 is a plan view of a phosphor member in the illumination device according to the first embodiment.

FIG. 3 is a plan view of the wavelength conversion element 4 viewed from the incident side of the excitation light BLc. It should be noted that in FIG. 3, the proceeding direction of the cooling gas in the case in which the cooling gas is supplied to a disk 42 in a rotating state is indicated by the arrows.

Figure 5:
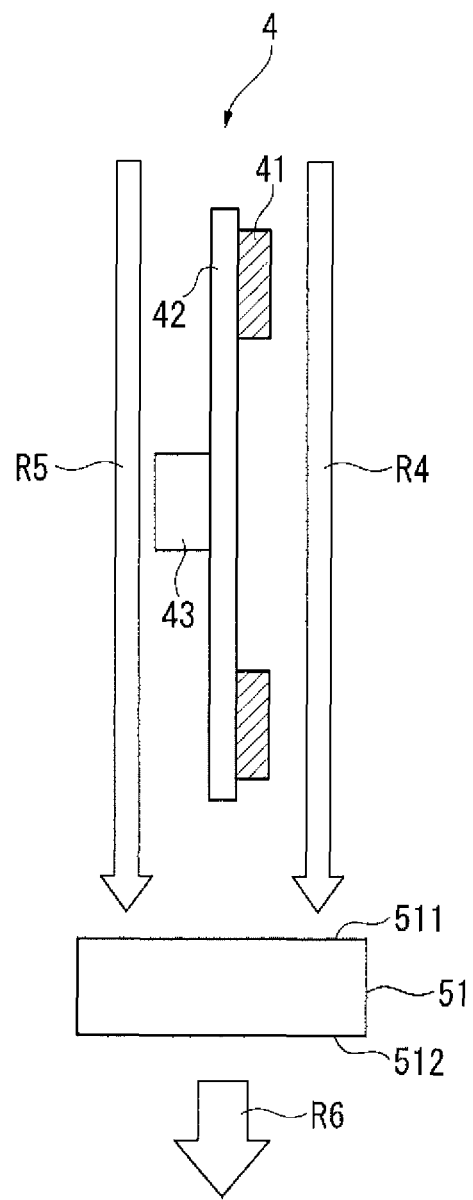
FIG. 5 is a diagram showing flow of a cooling gas in the wavelength conversion device according to the first embodiment.

The wavelength conversion element 4 constitutes the wavelength conversion device 6 together with the cooling device 5. As shown in FIGS. 2, 3, and 5, the wavelength conversion element 4 is an element having the wavelength conversion layer 41 for converting the wavelength of the incident light formed on the disk 42, which can be rotated by the motor 43, along the circumferential direction of the disk 42. The wavelength conversion layer 41 converts a part of the excitation light having entered the wavelength conversion layer 41 into the fluorescence and then emits the fluorescence, and at the same time emits another part without being converted into the fluorescence.

The disk 42 corresponds to a substrate according to the invention, and is rotated by the motor 43 in a direction S1 around a rotational axis P1 as shown in FIG. 3. As shown in FIG. 2, the wavelength conversion element 4 is disposed on the intake side of a first cooling fan 51 of the cooling device 5 described above. Specifically, the wavelength conversion element 4 is disposed on an intake surface 511 side of the first cooling fan 51.

Configuration of Cooling Device

As shown in FIG. 2, the cooling device 5 is provided with the first cooling fan 51. The first cooling fan 51 is a cooling device for cooling the wavelength conversion element 4, and sucks the cooling gas supplied to the wavelength conversion element 4 to eject the cooling gas to the outside of the exterior housing 2. The first cooling fan 51 corresponds to a first blower device according to the invention, and is disposed on the side of the disk 42 in the wavelength conversion element 4, namely in a direction perpendicular to the rotational axis P1 viewed from the disk 42.

Further, the intake surface 511 of the first cooling fan 51 is disposed so as to be opposed to the wavelength conversion element 4. In other words, the wavelength conversion element 4 is disposed in a negative-pressure region caused by driving the first cooling fan 51. Therefore, when the first cooling fan 51 is driven, the cooling gas flows from the intake surface 511 toward an exhaust surface 512.

It should be noted that the first cooling fan 51 is formed of an axial-flow fan. However, the first cooling fan 51 is not limited to this example, but can also be formed of a sirocco fan.

Figure 4:
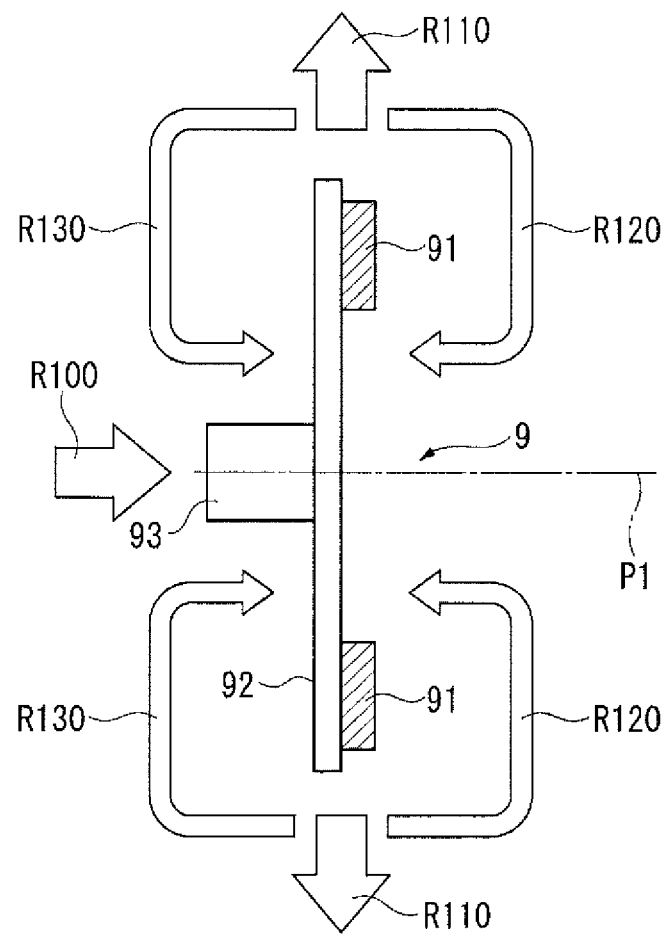
FIG. 4 is a diagram showing flow of a cooling gas in a wavelength conversion device according to the related art.

Flow of Cooling Gas for Wavelength Conversion Element in Related Art Configuration FIG. 4 is a cross-sectional view showing a cross-sectional surface of a wavelength conversion element 9 in a related art configuration. In FIG. 4, the proceeding direction of the cooling gas in the case in which the cooling gas is supplied to a disk 92 in a rotating state is indicated by the arrows. It should be noted that in FIG. 4, the wavelength conversion element 9, a wavelength conversion layer 91, the disk 92, and a motor 93 have substantially the same configurations as the wavelength conversion element 4, the wavelength conversion layer 41, the disk 42, and the motor 43, respectively.

Here, in the projector described in JP-A-2011-75898 described above, the flow of the cooling gas in the case in which the cooling gas is supplied to the wavelength conversion element will be described.

For example, in the case in which the cooling gas R100 is supplied to the central part of the disk 92 from the side in the disk 92, to which the motor 93 is connected, with respect to the wavelength conversion element 9, the cooling gas R100 spreads from the central part along the disk 92 to cool the disk 92. Then, due to the centrifugal force caused by the rotation of the disk 92, the cooling gas R100 is made to flow toward the outside of the disk 92 as a cooling gas R110. Further, as shown in FIG. 4, a part of the cooling gas R110 is spooled up again in the vicinity of the surface of the disk 92 due to the negative pressure caused by the rotation of the disk 92. Specifically, a part of the cooling gas R110 is supplied again to the disk 92 on the side where the wavelength conversion layer 91 is formed as a cooling gas R120. Further, another part of the cooling gas R110 is supplied again to the disk 92 on the side to which the motor 93 is connected, namely to which the cooling gas R100 is supplied, as a cooling gas R130. It should be noted that the same applies to the case in which the cooling gas R100 is supplied to the disk 92 from the side where the wavelength conversion layer 91 is located.

Flow of Cooling Gas in Wavelength Conversion Element

FIG. 5 is a diagram showing flow of the cooling gas in the wavelength conversion device 4 according to the invention.

In the present embodiment, the first cooling fan 51 in the cooling device 5 has a function of sucking the cooling gas in the periphery of the wavelength conversion element 4, and the intake surface 511 of the first cooling fan 51 is disposed on the side of the disk 42 described above. Therefore, the cooling gas supplied to the wavelength conversion element 4 is sucked by the first cooling fan 51 as cooling gases R4, R5 as shown in FIG. 5. It should be noted that although the disk 42 also rotates in the direction S1 described above in the present embodiment, since the sucking force of the first cooling fan 51 is stronger than the negative pressure caused by the rotation, the cooling gas is sucked by the first cooling fan 51 along the disk 42. In other words, the cooling gas used for cooling the disk 42 and thus heated is sucked by the first cooling fan 51 as the cooling gases R4, R5 without being supplied again to the disk 42. Therefore, the cooling gas having cooled the disk 42 is sucked by the first cooling fan 51 as the cooling gases R4, R5, and then discharged outside the exterior housing 2 as a cooling gas R6 as shown in FIG. 5.

Advantages of First Embodiment

According to the projector 1 related to the present embodiment described hereinabove, the following advantages can be obtained.

Since the wavelength conversion element 4 is disposed on the intake side of the first cooling fan 51, the cooling gases R4, R5 flow in the periphery of the wavelength conversion element 4 due to the first cooling fan 51 sucking the cooling gas, and therefore, the wavelength conversion element 4 is cooled. Further, since the cooling gases R4, R5 having been used for cooling the wavelength conversion element 4 and thus heated are sucked, even in the configuration in which the wavelength conversion element 4 rotates, there is reduced the chance that the cooling gases R4, R5 are spooled up again by the wavelength conversion element 4 to be retained in the periphery of the wavelength conversion element 4. Therefore, the cooling efficiency of the wavelength conversion element 4 can be improved.

Since the wavelength conversion element 4 is disposed in the negative-pressure region described above, the air, that is, the cooling gases R4, R5 having been used for cooling the wavelength conversion element 4, in the periphery of the wavelength conversion element 4 is sucked by the first cooling fan 51 in good condition. Therefore, the wavelength conversion element 4 can efficiently be cooled.

Compared to the case in which the first cooling fan 51 is disposed in a direction along the rotational axis P1 described above, the cooling gas in the periphery of the disk 42 can more efficiently be sucked. Further, compared to the case of disposing the first cooling fan 51 in a direction along the rotational axis P1 described above, selectability of the layout position of the first cooling fan 51 can be enhanced. Therefore, the wavelength conversion device 6 can be miniaturized.

Further, since the wavelength conversion element 4 can efficiently be cooled, the illumination device 31 can emit the stable illumination light WL.

Further, since the stable illumination light WL is supplied from the illumination device 31 equipped with the wavelength conversion device 6 described above, the projector 1 according to the present embodiment can project an image stable in luminance.

Second Embodiment

Then, a second embodiment of the invention will be described.

The projector according to the present embodiment is provided with substantially the same configuration as that of the projector 1 described above, but is different from the projector 1 described above in the point that the wavelength conversion device is further provided with a cooling fan for feeding the cooling gas to the wavelength conversion element 4. It should be noted that in the description below, a part which is the same or substantially the same as the part having already been described is denoted by a similar reference symbol, and the description thereof will be omitted.

Figure 6:
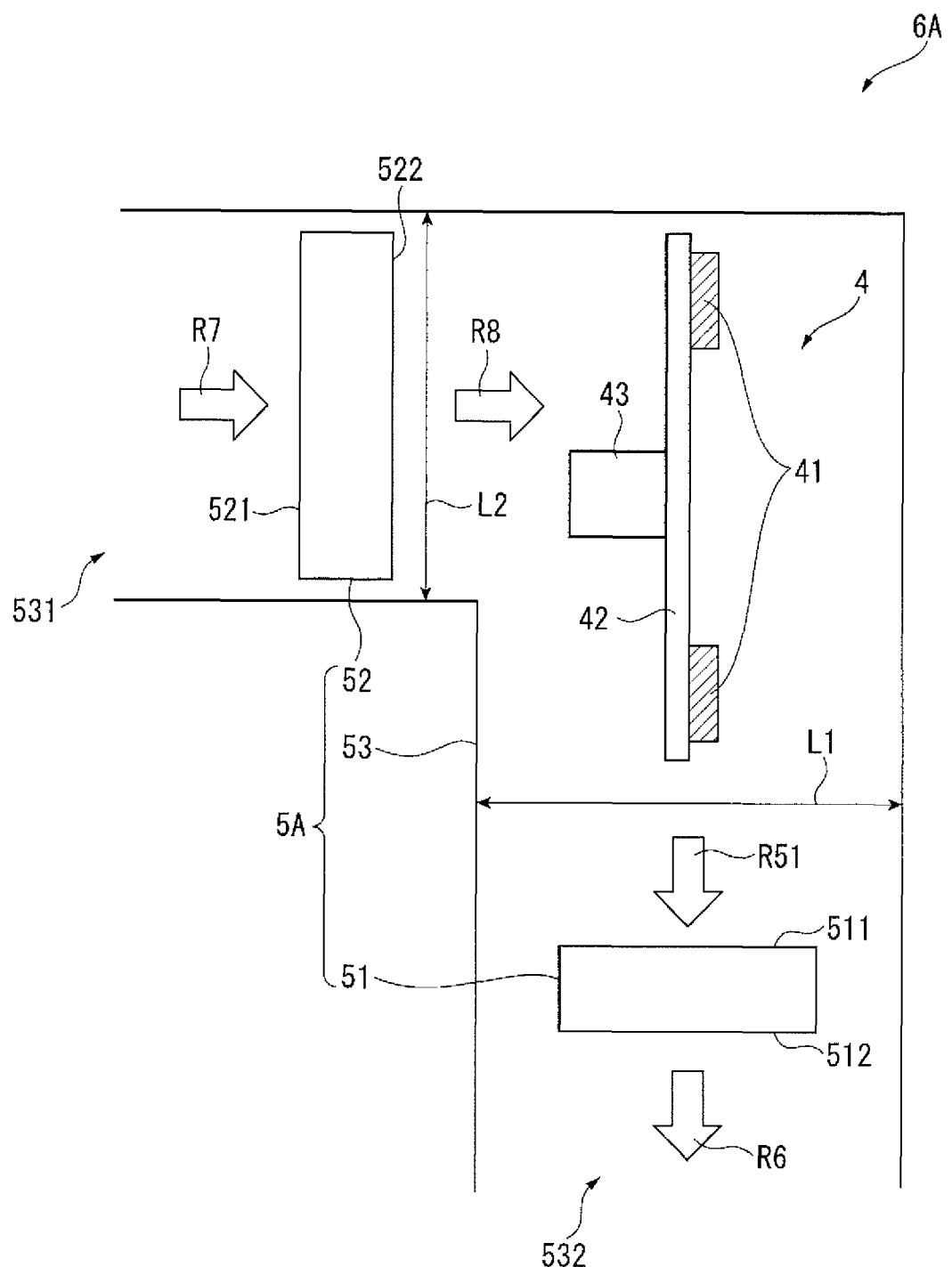
FIG. 6 is a schematic diagram showing a configuration of a wavelength conversion device of a projector according to a second embodiment of the invention.

FIG. 6 is a schematic diagram showing a general configuration of a wavelength conversion device 6A according to the present embodiment.

In the present embodiment, the wavelength conversion device 6A is provided with the wavelength conversion element 4 and a cooling device 5A as shown in FIG. 6. Among these components, the cooling device 5A is provided with a second cooling fan 52 and a duct 53 besides the first cooling fan 51 described above.

Configuration of Second Cooling Fan

As shown in FIG. 6, the second cooling fan 52 has an intake surface 521 and an exhaust surface 522, and has a function of sucking a cooling gas R7 through the intake surface 521, and then emitting (discharging) a cooling gas R8 toward the wavelength conversion element 4 through the exhaust surface 522. The second cooling fan 52 is formed of an axial-flow fan similarly to the first cooling fan 51. However, the second cooling fan 52 is not limited to this example, but can also be formed of a sirocco fan.

It should be noted that the second cooling fan 52 corresponds to a second blower device according to the invention.

Configuration of Duct and Layout in Duct

As shown in FIG. 6, the duct 53 is configured to have an L shape, and in both of the end of the duct 53, there are formed two opening 531, 532, respectively. On the opening 531 side of the duct 53, there is disposed the second cooling fan 52, and on the opening 532 side, there is disposed the first cooling fan 51. Further, the wavelength conversion element 4 is disposed between the first cooling fan 51 and the second cooling fan 52 in the flow path of the cooling gas. In other words, in the duct 53, there are disposed the wavelength conversion element 4, the first cooling fan 51 and the second cooling fan 52.

Specifically, the second cooling fan 52 is disposed at a position opposed to the disk 42 of the wavelength conversion element 4 in the duct 53. In other words, the wavelength conversion element 4 is disposed on the exhaust surface 522 side of the second cooling fan 52 in the duct 53. Further, the first cooling fan 51 is disposed on the side of the disk 42 of the wavelength conversion element 4, namely in a direction perpendicular to the rotational axis P1 viewed from the disk 42, similarly to the first embodiment described above.

It should be noted that the duct 53 corresponds to a first duct according to the invention.

Flow Path Resistance of Wavelength Conversion Device

Further, the dimension L1 of the duct 53 in a direction along the intake surface 511 between the intake surface 511 of the first cooling fan 51 and the wavelength conversion element 4 is larger than the dimension L2 in a direction along the exhaust surface 522 between the exhaust surface 522 of the second cooling fan 52 and the wavelength conversion element 4. In other words, the cross-sectional area of the flow path between the first cooling fan 51 and the wavelength conversion element 4 is larger than the cross-sectional area of the flow path between the second cooling fan 52 and the wavelength conversion element 4. Therefore, the flow path resistance between the intake surface 511 of the first cooling fan 51 and the wavelength conversion element 4 becomes smaller than the flow path resistance between the exhaust surface 522 of the second cooling fan 52 and the wavelength conversion element 4.

According to such a configuration, a cooling gas R7 inside the exterior housing 2 is sucked from the intake surface 521 side of the second cooling fan 52, and is supplied to the wavelength conversion element 4 as a cooling gas R8 from the exhaust surface 522. Then, the cooling gas R8 supplied to the wavelength conversion element 4 flows toward the intake surface 511 of the first cooling fan 51 along the disk 42 of the wavelength conversion element 4 although the detailed illustration is omitted. Since the flow path resistance between the first cooling fan 51 and the wavelength conversion element 4 is smaller than the flow path resistance between the second cooling fan 52 and the wavelength conversion element 4 as described above, a cooling gas R51 having cooled the wavelength conversion element 4 is efficiently sucked from the intake surface 511 side of the first cooling fan 51, and is discharged from the opening 532 of the duct 53 to the outside of the exterior housing 2 via the exhaust surface 512 of the first cooling fan 51.

Advantages of Second Embodiment

The projector provided with the wavelength conversion device 6A related to the present embodiment exerts the following advantages, in addition to the advantages substantially the same as those of the projector 1 described above.

Since the cooling gas is supplied by the second cooling fan 52 to the wavelength conversion element 4, the cooling efficiency of the wavelength conversion element 4 can be enhanced. Further, the flow path resistance between the intake surface 511 of the first cooling fan 51 and the wavelength conversion element 4 is smaller than the flow path resistance between the exhaust surface 522 of the second cooling fan 52 and the wavelength conversion element 4. According to this configuration, in the flow of the cooling gas in the periphery of the wavelength conversion element 4, since sucking of the cooling gas by the first cooling fan 51 is dominant over feeding of the cooling gas by the second cooling fan 52, the cooling gas supplied to the wavelength conversion element 4 by the second cooling fan 52 is more efficiently sucked by the first cooling fan 51. Therefore, the cooling efficiency of the wavelength conversion element 4 can further be improved.

Third Embodiment

Then, a third embodiment of the invention will be described.

The projector according to the present embodiment is provided with substantially the same configuration as that of the projector 1 described above, but is different from the first embodiment and the second embodiment in the configuration of the wavelength conversion device. Specifically, the projector according to the present embodiment is different from the projector 1 in the point that the wavelength conversion device has a closed housing for housing the wavelength conversion element 4 and the first cooling fan 51 inside. It should be noted that in the description below, a part which is the same or substantially the same as the part having already been described is denoted by a similar reference symbol, and the description thereof will be omitted.

Figure 7:
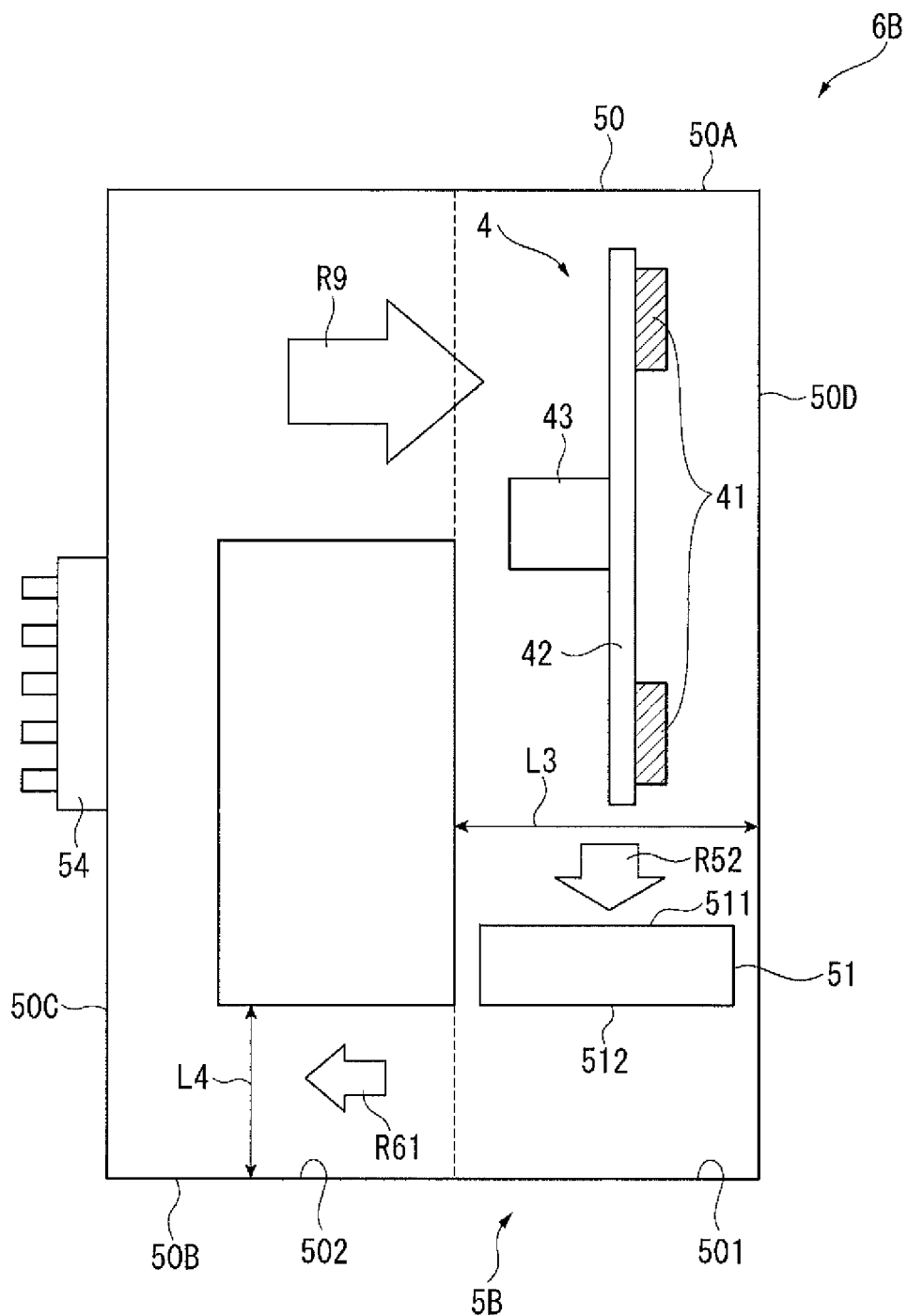
FIG. 7 is a schematic diagram showing a configuration of a wavelength conversion device of a projector according to a third embodiment of the invention.

FIG. 7 is a schematic diagram showing a general configuration of a wavelength conversion device 6B according to the present embodiment.

In the present embodiment, the wavelength conversion device 6B is provided with the wavelength conversion element 4 and a cooling device 5B as shown in FIG. 7. The cooling device 5B is provided with a closed housing 50 and a heat sink 54 besides the first cooling fan 51 described above. The cooling device 5B supplies the cooling gas cooled by the heat sink 54 to the wavelength conversion element 4 disposed inside the closed housing 50 to thereby cool the wavelength conversion element 4.

Configuration of Cooling Device

The closed housing 50 is a box-like housing for housing the wavelength conversion element 4 and the first cooling fan 51, and is disposed inside the exterior housing 2. The closed housing 50 has a closed structure hard for the gas located outside the closed housing 50 to flow inside. In other words, the wavelength conversion element 4 and the first cooling fan 51 are roughly encapsulated by the closed housing 50.

The closed housing 50 is provided with a top surface part 50A, a bottom surface part 50B, a first side surface part 50C, and a second side surface part 50D. The closed housing 50 is formed of a first duct 501 having a rectangular shape and a second duct 502 having a roughly U shape communicated with each other.

Among these constituents, the first duct 501 constitutes a part of the top surface part 50A described above, the second side surface part 50D, and a part of the bottom surface part 50B.

Further, the second duct 502 constitutes a part of the top surface part 50A, the first side surface part 50C, and a part of the bottom surface part 50B. Due to the first duct 501 and the second duct 502, the closed housing 50 constitutes a circulating flow path through which the internal air circulates in a circular manner.

The wavelength conversion element 4 is disposed on the top surface part 50A side in the first duct 501. Further, the first cooling fan 51 is disposed on the bottom surface part 50B side in the first duct 501. In other words, in the closed housing 50, the wavelength conversion element 4 and the first cooling fan 51 are arranged in substantially the same manner as in the first embodiment.

The heat sink 54 has a function of dropping the temperature of a region to which the heat sink 54 is connected. The heat sink 54 is connected to the first side surface part 50C of the second duct 502.

Due to the configuration described above, when the first cooling fan 51 is driven, a cooling gas R52 having cooled the wavelength conversion element 4 is sucked by the intake surface 511 of the first cooling fan 51 along the first duct 501, and is then discharged as a cooling gas R61 from the exhaust surface 512 toward the first side surface part 50C side of the second duct 502. Further, the cooling gas R61 is cooled by the heat sink 54 in the process of flowing along the second duct 502. The cooling gas R61 having been cooled by the heat sink 54 is supplied as a cooling gas R9 toward the wavelength conversion element 4 via the second duct 502. Subsequently, the cooling gas R52 having cooled the wavelength conversion element 4 is sucked again by the first cooling fan 51 along the first duct 501. As described above, the cooling gas in the closed housing 50 cools the wavelength conversion element 4, and is also cooled by the heat sink 54 in the process of being circulated in a circular manner.

Flow Path Resistance in Closed Housing

Here, the flow path resistance of the cooling gas flowing in the closed housing 50 will be described.

The dimension L3 (the dimension of the flow path between the intake surface 511 of the first cooling fan 51 and the wavelength conversion element 4) of the first duct 501 perpendicular to the second side surface part 50D is larger than the dimension L4 (the dimension of the flow path between the exhaust surface 512 of the first cooling fan 51 and the wavelength conversion element 4) of the second duct 502 perpendicular to the bottom surface part 50B. In other words, the cross-sectional area of the flow path between the intake surface 511 of the first cooling fan 51 and the wavelength conversion element 4 is larger than the cross-sectional area of the flow path between the exhaust surface 512 of the first cooling fan 51 and the wavelength conversion element 4. Therefore, the flow path resistance between the intake side of the first cooling fan 51 and the wavelength conversion element 4 is smaller than the flow path resistance between the exhaust side of the first cooling fan 51 and the wavelength conversion element 4.

Thus, the cooling gas R52 having cooled the wavelength conversion element 4 (the disk 42) is efficiently sucked by the first cooling fan 51, and thus the cooling gas smoothly circulates in the closed housing 50.

Advantages of Third Embodiment

The projector provided with the wavelength conversion device 6B described above exerts the following advantages, in addition to the advantages substantially the same as those of the projector 1 described above.

Since the flow path resistance between the intake surface 511 of the first cooling fan 51 and the wavelength conversion element 4 is smaller than the flow path resistance between the exhaust surface 512 of the first cooling fan 51 and the wavelength conversion element 4, sucking on the intake surface 511 side of the first cooling fan 51 is dominant over feeding on the exhaust surface 512 side of the first cooling fan 51. Thus, since the cooling gas in the periphery of the wavelength conversion element 4 can efficiently be sucked, the cooling efficiency of the wavelength conversion element 4 can surely be enhanced.

Since the wavelength conversion element 4 and the first cooling fan 51 are roughly encapsulated by the closed housing 50, the gas located outside the closed housing 50 can be inhibited from flowing into the closed housing 50. Therefore, the dust can be inhibited from flowing into the closed housing 50, and by extension, the dust can further be inhibited from adhering to the wavelength conversion element 4.

Fourth Embodiment

Then, a fourth embodiment of the invention will be described.

The projector according to the present embodiment is provided with substantially the same configuration as that of the projector 1 described above, but is different from the first embodiment in the point that the cooling device is provided with a duct. Therefore, only the point in which the projector is different from the projector 1 according to the first embodiment will be described.

Figure 8:
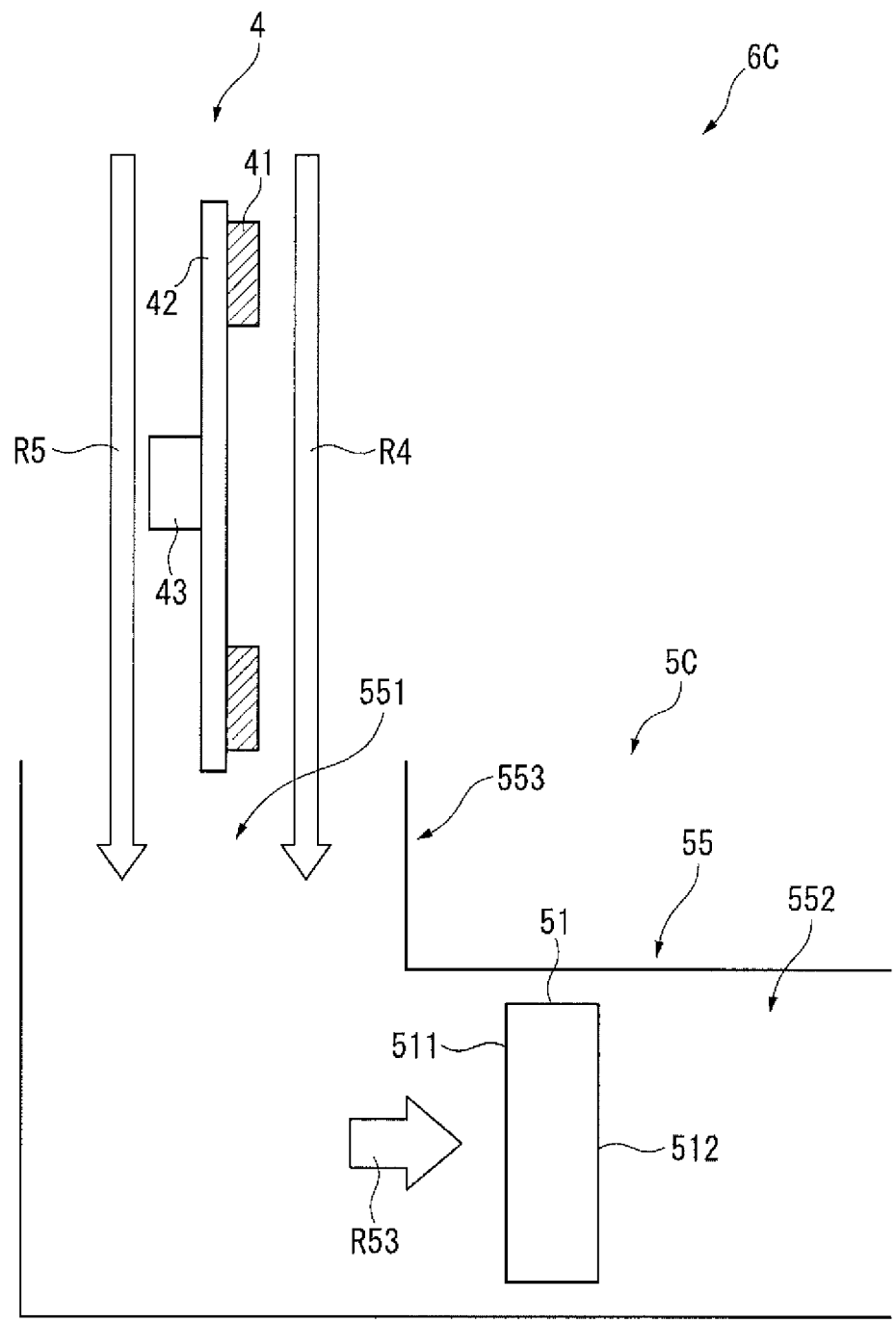
FIG. 8 is a schematic diagram showing a configuration of a wavelength conversion device of a projector according to a fourth embodiment of the invention.

FIG. 8 is a schematic diagram showing a general configuration of the wavelength conversion device 6C according to the present embodiment.

The wavelength conversion device 6C is provided with the wavelength conversion element 4 and a cooling device 5C as shown in FIG. 8. The cooling device 5C is provided with a duct 55 corresponding to a second duct according to the invention, and the first cooling fan 51 disposed inside the duct 55.

The duct 55 has an opening 551 and an opening 552. Further, the duct 55 has a suction part 553 extending in a direction perpendicular to the rotational axis P1 described above, and the opening 551 is disposed in the suction part 553. Further, the duct 55 is disposed so that the opening 551 faces the side of the wavelength conversion element 4. Therefore, the cooling gases R4, R5 are efficiently sucked through the opening 551. Then, the cooling gases R4, R5 sucked through the opening 551 are discharged to the outside of the exterior housing 2 through the opening 552 via the exhaust surface 512 of the first cooling fan 51.

It should be noted that the cooling gases R4, R5 are not necessarily required to be discharged to the outside of the exterior housing 2. Further, although in the present embodiment, the first cooling fan 51 is disposed inside the duct 55, it is also possible for the first cooling fan 51 to be connected to the opening 552.

Advantages of Fourth Embodiment

The projector provided with the wavelength conversion device 6C described above exerts the following advantages, in addition to the advantages substantially the same as those of the projector 1 described above.

Since the wavelength conversion device 6C is provided with the duct 55, the cooling gases R4, R5 having been used for cooling the wavelength conversion element 4 to thereby be heated are efficiently sucked by the first cooling fan 51. Further, since the cooling gases R4, R5 are discharged to the outside of the exterior housing 2 from the opening 552, the cooling gases R4, R5 having been heated are inhibited from flowing again toward the wavelength conversion element 4. As a result, the cooling efficiency of the wavelength conversion element 4 can further be improved.

It should be noted that although the cooling gases R4, R5 are more efficiently sucked by the duct 55 if the suction part 553 is perpendicular to the rotational axis, it is not necessarily required for the suction part 553 to be perpendicular to the rotational axis, but it is sufficient for the suction part 553 to cross the rotational axis.

Modifications of Embodiments

The invention is not limited to the embodiments described above, but may include modifications, improvements, and so on in the range where the advantages of the invention can be achieved.

In each of the embodiments described above, the wavelength conversion element 4 is assumed to be provided with the wavelength conversion layer 41 disposed on the rotatable disk 42. However, the invention is not limited to this configuration. For example, it is also possible for the phosphor member described above to be formed of a wavelength conversion layer fixed to a substrate to which the heat sink is connected, or it is also possible for the phosphor member to be formed only of the wavelength conversion layer fixed to the substrate. In other words, it is also possible to adopt a configuration in which the wavelength conversion layer 41 does not rotate. Even in such a configuration, since the cooling gas in the periphery of the phosphor member can be sucked by the first cooling fan 51, substantially the same advantages as those of the embodiments described above can be exerted.

In the second embodiment, it is assumed that the second fan 52 is provided. However, the invention is not limited to this configuration. For example, the second cooling fan 52 can be eliminated similarly to the first embodiment. Even in this case, since the cooling gas is supplied to the wavelength conversion element 4 due to sucking by the first cooling fan 51, substantially the same advantages as those of the first embodiment can be exerted.

Further, the wavelength conversion element 4 is disposed on the exhaust surface 522 side of the second cooling fan 52. However, the invention is not limited to this configuration. For example, the wavelength conversion element 4 can be disposed on the intake surface 521 side of the second cooling fan 52.

In the second embodiment described above, it is assumed that the first cooling fan 51 and the second cooling fan 52 are formed of the respective fans the same in type. However, the invention is not limited to this configuration. For example, it is also possible to configure one of the first cooling fan 51 and the second cooling fan 52 using an axial-flow fan, and to configure the other using a sirocco fan. Further, it is also possible to set the suction force of the first cooling fan 51 to be different from the ejection force of the second cooling fan 52.

In the third embodiment, the wavelength conversion element 4 and the first cooling fan 51 are assumed to be disposed inside the closed housing 50. However, the invention is not limited to this configuration. For example, the closed housing 50 can be eliminated. In other words, the circulation flow path can be formed of a duct instead of the closed housing 50.

The wavelength conversion element 4 and the first cooling fan 51 are assumed to be roughly encapsulated by the closed housing 50. However, the invention is not limited to this configuration. For example, an opening or the like can also be disposed in a part of the closed housing 50.

In the third embodiment, the cooling device 5B is provided with the first cooling fan 51. However, the invention is not limited to this configuration. For example, the second cooling fan 52 for supplying the wavelength conversion element 4 with the cooling gas can further be provided similarly to the second embodiment. In this case, it is sufficient for the second cooling fan 52 to be disposed so that the exhaust surface 522 is opposed to the disk 42 of the wavelength conversion element 4.

In the third embodiment described above, it is assumed that the closed housing 50 is provided with the heat sink 54. However, the invention is not limited to this configuration. For example, the heat sink 54 is not required to be disposed, it is also possible to dispose a cooling device for cooling the closed housing 50 (the cooling gas in the closed housing 50) instead of the heat sink 54, or it is also possible to form the closed housing 50 using a thermally-conductive material (metal or thermally-conductive resin).

In the third embodiment described above, it is assumed that the flow path resistance between the intake surface 511 of the first cooling fan 51 and the wavelength conversion element 4 becomes smaller than the flow path resistance between the exhaust surface 512 of the first cooling fan 51 and the wavelength conversion element 4. However, the invention is not limited to this configuration. For example, it is also possible that the flow path resistance between the intake surface 511 of the first cooling fan 51 and the wavelength conversion element 4 is the same as the flow path resistance between the exhaust surface 512 of the first cooling fan 51 and the wavelength conversion element 4. In this case, the dimension L3 (the dimension between the intake side of the first cooling fan 51 and the wavelength conversion element 4) of the first duct 501 perpendicular to the second side surface part 50D can be set to be the same as the dimension L4 (the dimension between the exhaust side of the first cooling fan 51 and the wavelength conversion element 4) of the second duct 502 perpendicular to the bottom surface part 50B. According to this configuration, the closed housing 50 can more easily be simplified.

In the fourth embodiment described above, it is assumed that the first cooling fan 51 is disposed in the duct 55. However, the invention is not limited to this configuration. For example, it is also possible to dispose the second cooling fan 52 in the duct 55 in addition to the first cooling fan 51 similarly to the second embodiment. Even in this configuration, substantially the same advantages as in the fourth embodiment described above can be exerted.

In each of the embodiments described above, it is also possible to dispose a plate-like current member for adjusting the flow of the cooling gas in the flow path between the intake surface 511 of the first cooling fan 51 and the wavelength conversion element 4. According to this configuration, the flow path resistance between the intake surface 511 side of the first cooling fan 51 and the wavelength conversion element 4 can be made much smaller than the flow path resistance between the exhaust surface 512 side of the first cooling fan 51 and the wavelength conversion element 4.

In each of the embodiments described above, the transmissive light modulation devices 34 (34R, 34G, and 34B) are used as the light modulation devices. However, the invention is not limited to this configuration. For example, it is also possible to use reflective light modulation devices instead of the transmissive light modulation devices. In this case, it is also possible to perform color separation and color composition using the color combining device 35 without providing the color separation device 32.

In each of the embodiments described above, the projector 1 is equipped with the three light modulation devices 34 (34R, 34G, and 34B), but the invention is not limited to this configuration. Specifically, the invention can also be applied to a projector using two or less light modulation devices, or four or more light modulation devices.

Further, a digital micromirror device or the like can also be used as the light modulation device.

It is also possible to use the illumination device described in each of the embodiments described above for lighting equipment or a spotlight or the like for a vehicle or the like.

The entire disclosure of Japanese Patent Application No. 2015-138885, filed on Jul. 10, 2015 is expressly incorporated by reference herein.

What is claimed is:

1. A wavelength conversion device comprising:
a wavelength conversion element; and
a cooling device adapted to cool the wavelength conversion element, wherein:
the cooling device has a first blower device,
the wavelength conversion element is disposed on an intake side of the first blower device,
the wavelength conversion element is disposed in a negative-pressure region caused by driving the first blower device, and
the wavelength conversion element includes:
a substrate rotatable around a rotational axis, and
a phosphor layer disposed on the substrate.

2. The wavelength conversion device according to claim 1, wherein
the cooling device further includes
a second blower device adapted to feed a cooling gas to the wavelength conversion element, and
a first duct in which the wavelength conversion element, the first blower device, and the second blower device are disposed, and
a flow path resistance between an intake surface of the first blower device and the wavelength conversion element is smaller than a flow path resistance between an exhaust surface of the second blower device and the wavelength conversion element.

3. The wavelength conversion device according to claim 1, wherein
the cooling device further includes a housing adapted to house the wavelength conversion element and the first blower device, and having a circulation flow path through which a cooling gas having been discharged by the first blower device is supplied to the wavelength conversion element, and
a flow path resistance between an intake surface of the first blower device and the wavelength conversion element is smaller than a flow path resistance between an exhaust surface of the first blower device and the wavelength conversion element.

4. The wavelength conversion device according to claim 3, wherein
the wavelength conversion element and the first blower device are roughly encapsulated by the housing.

5. The wavelength conversion device according to claim 1, wherein
the first blower device is located in a direction perpendicular to the rotational axis viewed from the substrate.

6. The wavelength conversion device according to claim 1, wherein
the cooling device further includes a second duct disposed in a flow path between the wavelength conversion element and the first blower device, and
the second duct has a suction part extending in a direction crossing the rotational axis.

7. An illumination device comprising:
the wavelength conversion device according to claim 1; and
a light emitting element adapted to emit excitation light entering the wavelength conversion element.

8. An illumination device comprising:
the wavelength conversion device according to claim 2; and
a light emitting element adapted to emit excitation light entering the wavelength conversion element.

9. An illumination device comprising:
the wavelength conversion device according to claim 3; and
a light emitting element adapted to emit excitation light entering the wavelength conversion element.

10. An illumination device comprising:
the wavelength conversion device according to claim 4; and
a light emitting element adapted to emit excitation light entering the wavelength conversion element.

11. A projector comprising:
the illumination device according to claim 7;
a light modulation device adapted to modulate light emitted from the illumination device in accordance with an image signal;
a projection optical device adapted to project the light modulated by the light modulation device; and
an exterior housing adapted to house the illumination device, the light modulation device, and the projection optical device.

12. A projector comprising:
the illumination device according to claim 8;
a light modulation device adapted to modulate light emitted from the illumination device in accordance with an image signal;
a projection optical device adapted to project the light modulated by the light modulation device; and
an exterior housing adapted to house the illumination device, the light modulation device, and the projection optical device.

13. A projector comprising:
the illumination device according to claim 9;

a light modulation device adapted to modulate light emitted from the illumination device in accordance with an image signal;

a projection optical device adapted to project the light modulated by the light modulation device; and an exterior housing adapted to house the illumination device, the light modulation device, and the projection optical device.

14. A projector comprising:

the illumination device according to claim 10;

a light modulation device adapted to modulate light emitted from the illumination device in accordance with an image signal;

a projection optical device adapted to project the light modulated by the light modulation device; and an exterior housing adapted to house the illumination device, the light modulation device, and the projection optical device.

15. The wavelength conversion device according to claim 1, wherein the wavelength conversion element is spaced from the first blower device.

\* \* \* \* \*